(12) United States Patent
Taniguchi et al.

(10) Patent No.: US 8,163,319 B2
(45) Date of Patent: Apr. 24, 2012

(54) METHOD OF PRODUCTION OF AN ALCOHOL-DIPPED FOOD OR DRINK

(75) Inventors: Takayuki Taniguchi, Toyonaka (JP);
Tokutomi Watanabe, Fuchu (JP);
Hiroyuki Fujiwara, Nagaokakyo (JP);
Mika Terada, Ibaraki (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 724 days.

(21) Appl. No.: 11/658,091

(22) PCT Filed: Jul. 22, 2005

(86) PCT No.: PCT/JP2005/013489
§ 371 (c)(1),
(2), (4) Date: Nov. 18, 2008

(87) PCT Pub. No.: WO2006/009252
PCT Pub. Date: Jan. 26, 2006

(65) Prior Publication Data
US 2009/0087526 A1    Apr. 2, 2009

(30) Foreign Application Priority Data

Jul. 23, 2004    (JP) .................................. 2004-216428

(51) Int. Cl.
*A23L 1/302*    (2006.01)
(52) U.S. Cl. .......................... 426/311; 426/592; 426/546
(58) Field of Classification Search .................. 426/311, 426/592, 546
See application file for complete search history.

(56) References Cited

U.S. PATENT DOCUMENTS

| | | | | |
|---|---|---|---|---|
| 1,979,124 | A * | 10/1934 | Tival ............................. | 426/327 |
| 3,824,323 | A * | 7/1974 | Harvey et al. ................. | 426/429 |
| 5,230,889 | A | 7/1993 | Inoue | |
| 6,124,525 | A * | 9/2000 | Botella ........................ | 623/1.15 |
| 6,350,477 | B1 | 2/2002 | Yamamoto et al. | |
| 6,465,019 | B1 | 10/2002 | Bok et al. | |

FOREIGN PATENT DOCUMENTS

| | | |
|---|---|---|
| DE | 20121482 U1 | 1/2003 |
| JP | 55-061778 | 5/1980 |
| JP | 58-134942 | 8/1983 |
| JP | 60-237958 | 11/1985 |
| JP | 61-166353 | 7/1986 |
| JP | 4-316448 | 11/1992 |
| JP | 10-262641 | 10/1998 |
| JP | 2000-312579 | 11/2000 |
| JP | 2000-350571 | 12/2000 |
| JP | 2001-299323 | 10/2001 |
| JP | 2002-511237 | 4/2002 |
| JP | 2002-125653 | 5/2002 |
| JP | 2002-360241 | 12/2002 |
| JP | 2005-124567 | 5/2005 |
| WO | WO-9921549 A1 | 5/1999 |

OTHER PUBLICATIONS

Edited by Shufunotomo Co., Ltd., Tsukemono to Kajitsushu, Shufunotomo Co., Ltd., 1997, pp. 105-127 (in Japanese).
International Search Report dated Nov. 8, 2005 in PCT/JP2005/013489 filed Jul. 22, 2005.
European Search Report issued May 16, 2011 in Appln. No. 05761791.2.
Database WPI Week 200271 Thomson Scientific, London, GB; AN 2002-658679 XP002525622 & CN 1 351 985 A (PAN J) Jun. 5, 2002.
Database WPI Week 200230 Thomson Scientific, London, GB; AN 2002-248238 XP002525623 & JP 2002 029975 A (POKKA Corp KK) Jan. 29, 2002.
Database WPI Week 200331 Thomson Scientific, London, GB; AN 2003-316769 XP002525624 & JP 2001 204425 A (POKKA Corp KK) Jul. 31, 2001.
Database WPI Week 198319 Thomson Scientific, London, GB; AN 1983-44993K XP002525625 & JP 58 053995 A (Hasegawa Co Ltd) Mar. 30, 1983.

* cited by examiner

*Primary Examiner* — Anthony Weier
(74) *Attorney, Agent, or Firm* — Drinker Biddle & Reath LLP

(57) ABSTRACT

The present invention provides a method of producing an alcohol-dipped material or a food or drink using the same which includes the following steps: (a) freezing one or more fruits and/or vegetables employed as a raw material; (b) micro grinding the frozen matter; and (c) dipping the micro ground matter in an alcohol having a concentration at which one or more components of the raw material can be extracted (preferably a 15% to 100% alcohol). The alcohol-dipped material thus obtained can be suitably usable as a starting alcohol drink for producing a low-alcohol drink. According to the method of the invention, the alcohol-dipped material or the food or the drink thus obtained can contain a sufficient amount of an efficacious and effective component contained in the vegetable(s) and/or fruit(s), for example, vitamin P.

4 Claims, 5 Drawing Sheets

[Fig. 1A]
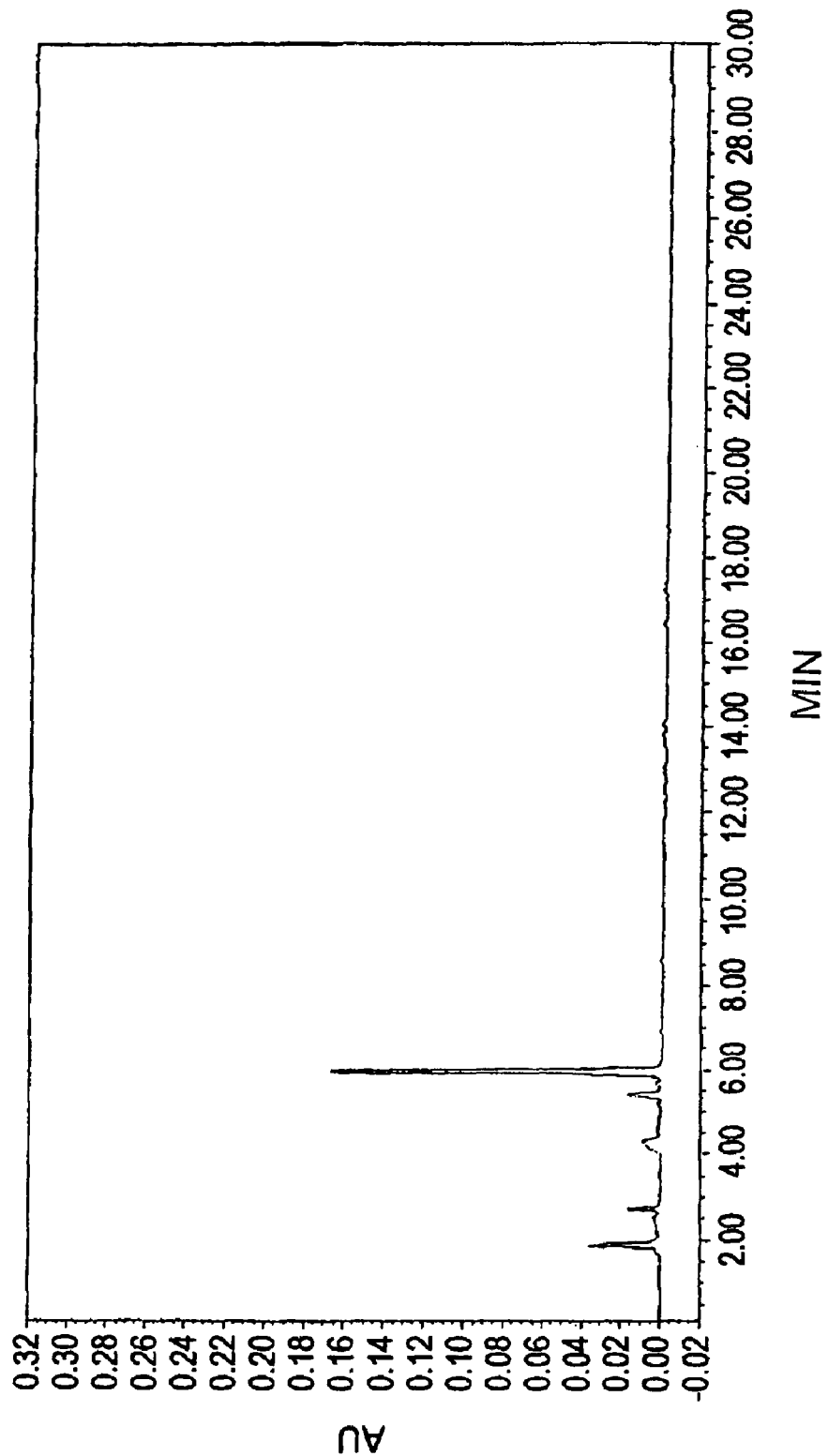

[Fig. 1B]
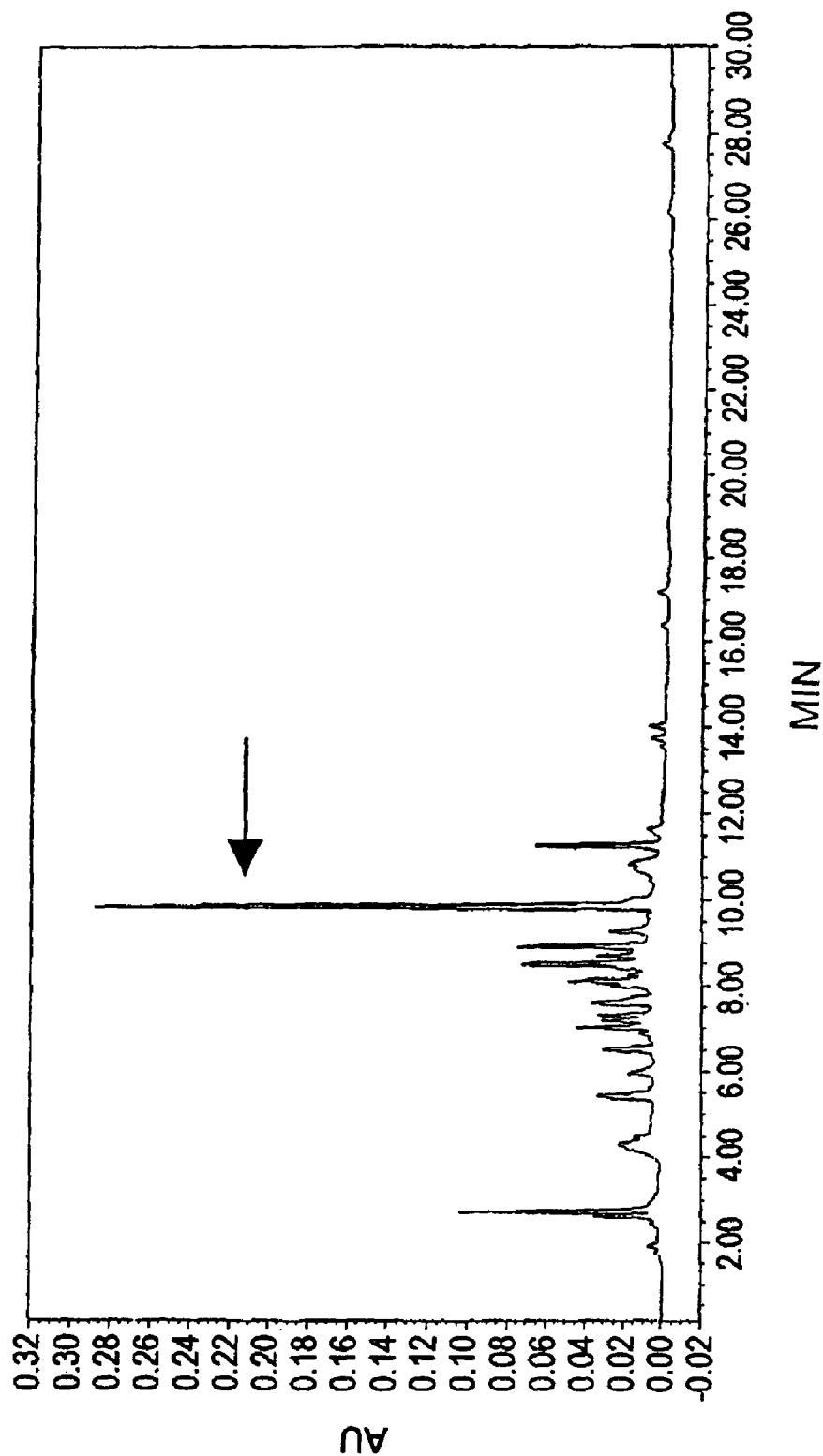

[Fig. 1C]
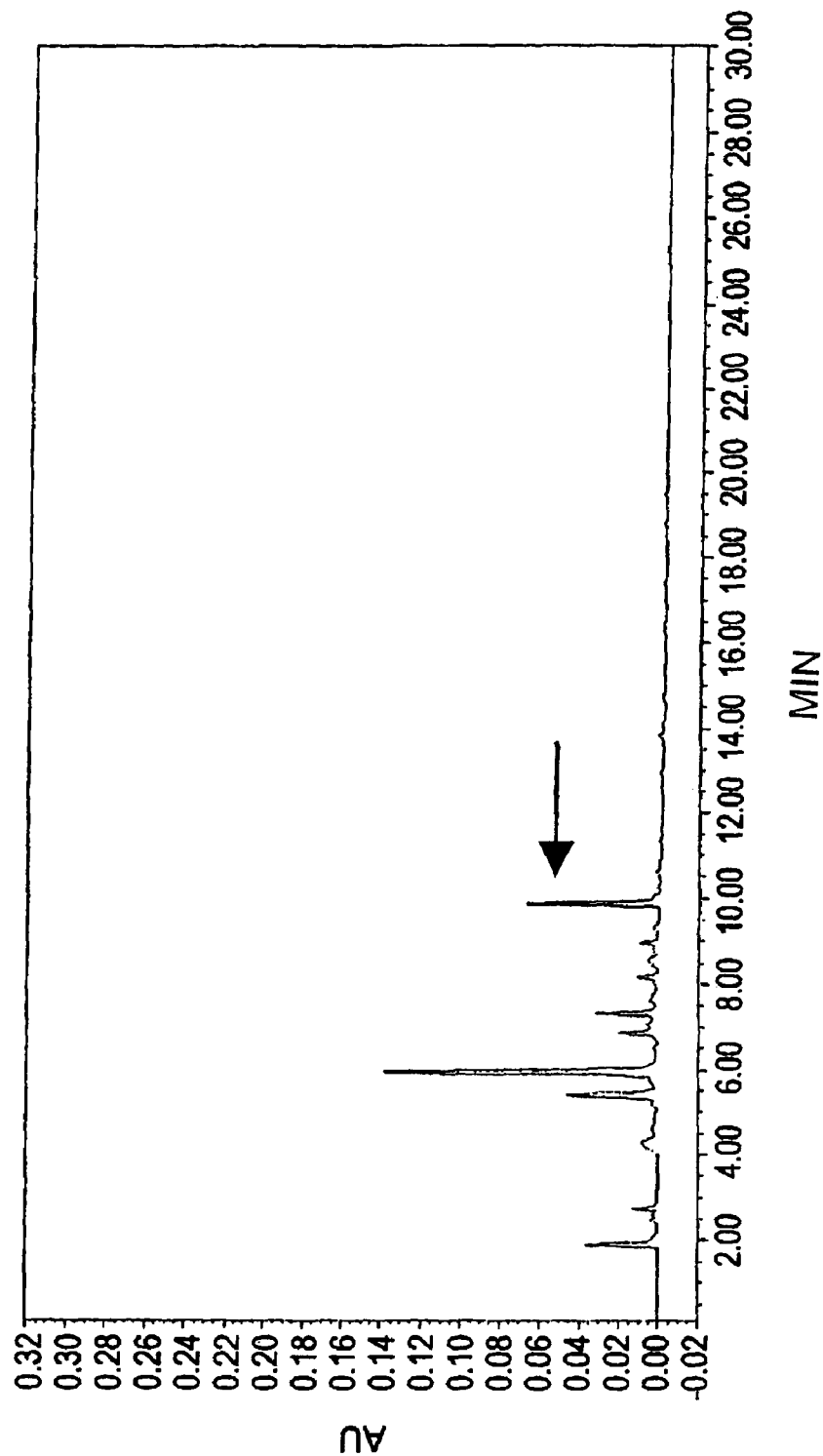

[Fig. 1D]
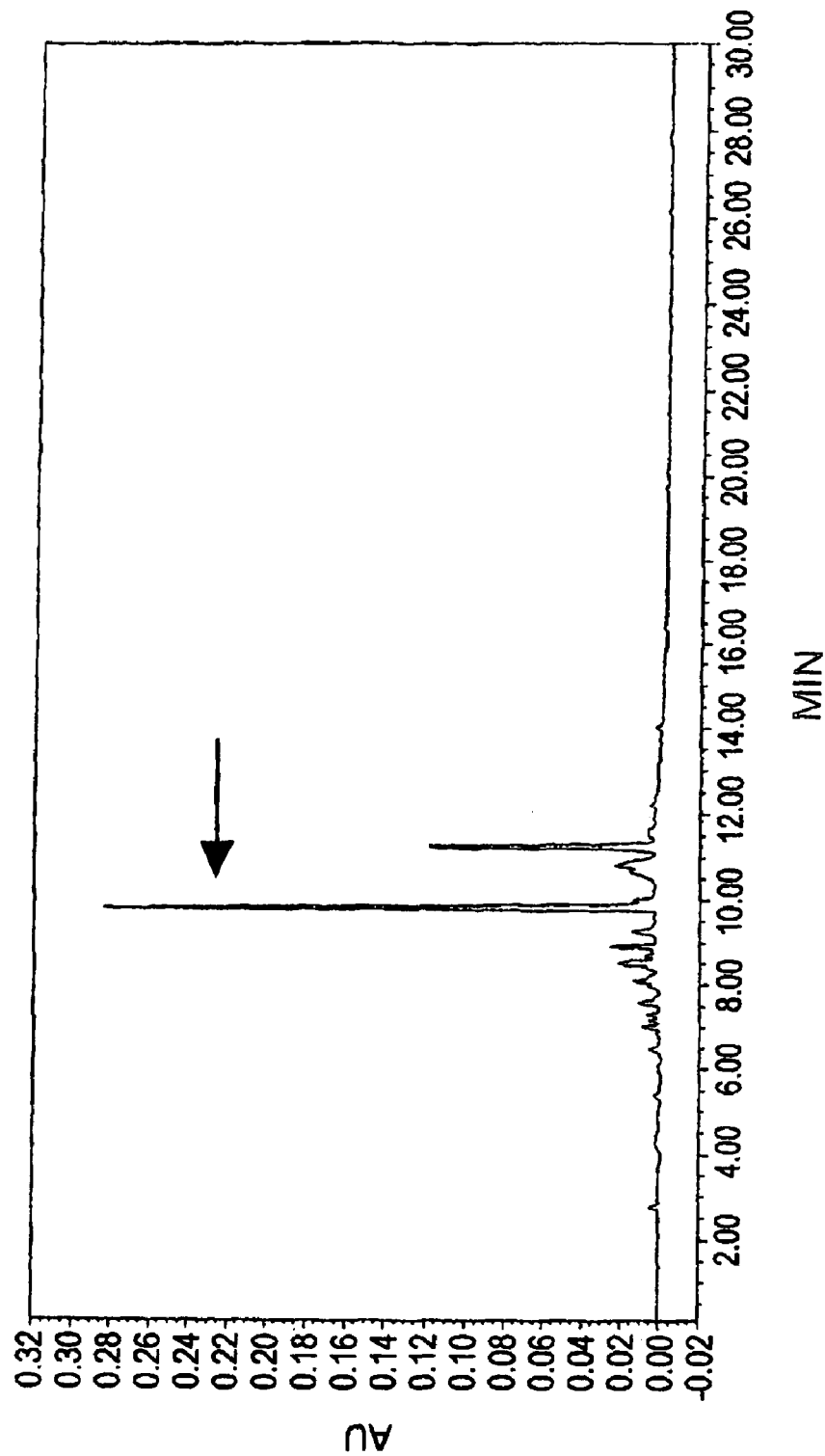

[Fig. 1E]
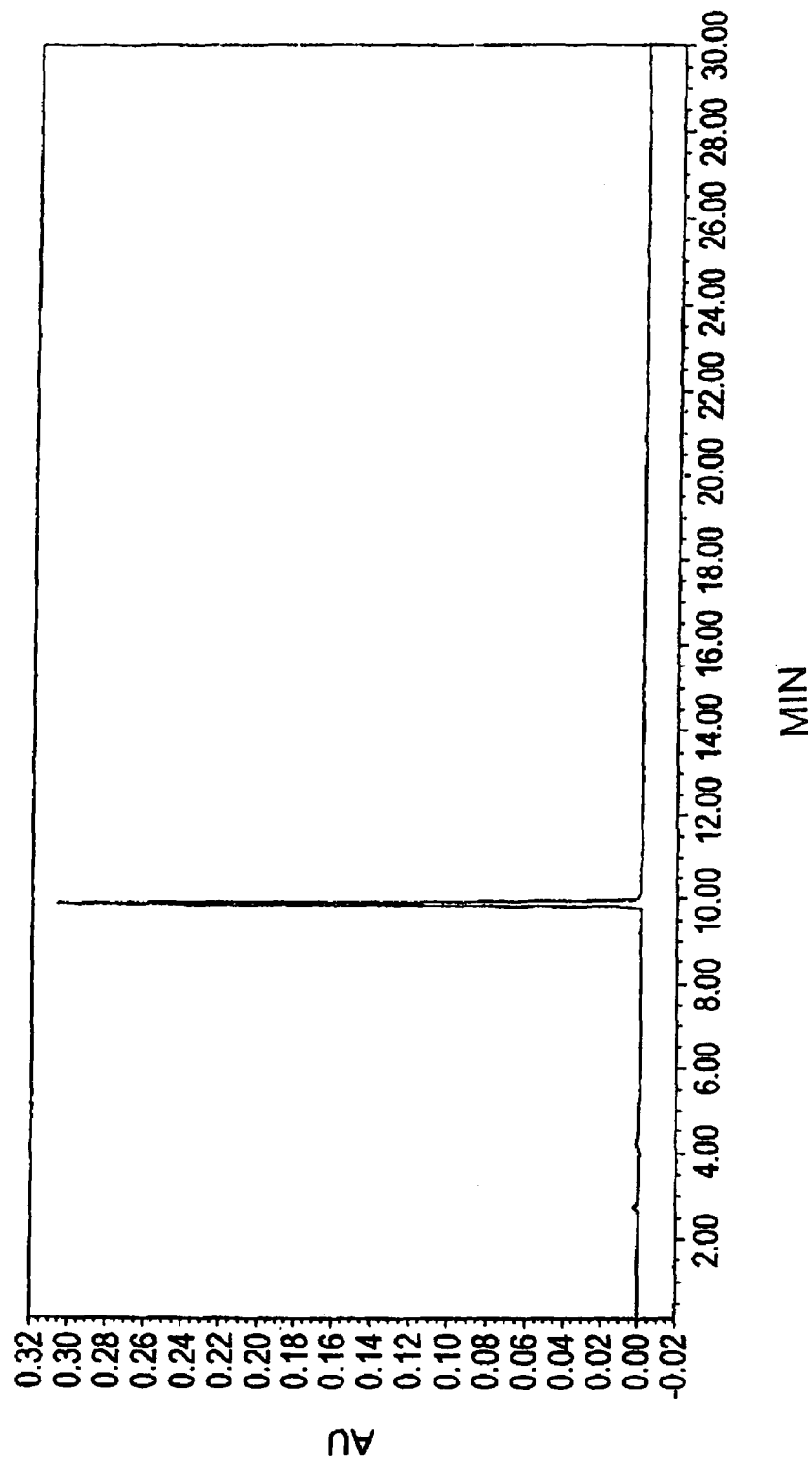

METHOD OF PRODUCTION OF AN ALCOHOL-DIPPED FOOD OR DRINK

CROSS REFERENCE TO RELATED APPLICATIONS

This application is the National Stage of International Application No. PCT/JP2005/013489, filed Jul. 22, 2005, and claims benefit of Japanese Application No. 2004-216428, filed Jul. 23, 2004, which is incorporated herein in its entirety.

TECHNICAL FIELD

The present invention relates to an alcohol-dipped material containing materials originating in fruit(s) and/or vegetable(s), a food or drink using the same and a method of production thereof. The alcohol-dipped material according to the present invention is usable as a starting material for producing foods or drinks. In particular, it can be suitably used in producing low alcohol drinks.

BACKGROUND ART

There have been produced various alcohol drinks containing materials originating in fruits and vegetables (for example, juice and pericarp) as starting materials. In recent years, alcohol drinks having a degree of alcohol less than 9°, which are generally called "low alcohol drinks", and drinks in cans, bottles and PET bottles, which are called RTD (Ready To Drink) products because they can be drunk out of the container without being poured into a glass, are becoming increasingly popular. For example canned shochu-based drinks (chuhai) containing a fruit juice and carbonic acid fall within this category.

In preparing and handling fruit-origin materials used as raw materials for producing low alcohol drinks, various devices have been made to utilize the characteristics of the fruits in the final products. To produce a distilled liquor or an alcohol drink containing a fruit dipped in alcohol which keeps the fresh aroma of the raw fruit, is free from the generation of a secondary smell by heating, and thus has a natural flavor; for example, studies have been made of a method comprising dipping a fresh fruit in an aqueous alcohol solution having an appropriate concentration, vacuum-distilling the alcohol extract thus obtained under appropriately reduced pressure and collecting the distillate (Patent document 1). Also, there has been proposed a product which is prepared by freezing a fruit juice as such without vacuum-concentration (heating) to thereby avoid damage to the freshness of the raw fruit.

To stably supply a material keeping the flavor and color of Japanese persimmon at all times of the year, on the other hand, studies have also been made on a technique whereby Japanese persimmons are frozen by using liquid nitrogen, ground with a low-temperature grinder and then freeze-dried in vacuo to give a powder, though it is not intended to use Japanese persimmon as a raw material in producing low alcohol drinks in this case (Patent document 2).

Patent document 1: Japanese Patent Laid-Open No. 2002-125653
Patent document 2: Japanese Patent Laid-Open SHO-61-166353

DISCLOSURE OF INVENTION

In citrus fruits, aroma components are contained in a larger amount in the pericarp than in the fruit juice. Thus, citrus fruit-type low alcohol drinks with effort for fully utilizing the fruit flavor produced at present contain either combination of fruit juice with a perfume or a relatively large amount of fruit juice. In contrast, major aroma components of stony fruits are contained in seeds.

The present inventors conducted intensive studies to develop a novel RTD. As a result, they have successfully found that starting alcohols, which have been prepared by micro grinding a whole fresh fruit in frozen state and then dipping it in alcohol, surprisingly keep the flavor of the fruit, contain various effective components and show a high storage stability, thereby completing the present invention. That is, the invention aims at providing an alcohol-dipped material keeping the flavor of a fruit as such and being superior in flavor to existing products, and a drink.

BRIEF DESCRIPTION OF THE DRAWINGS

FIG. 1A shows the HPLC chart of a marketed chuhai A.
FIG. 1B shows the HPLC chart of a marketed chuhai B wherein the arrow indicates the peak assignable to eriocitrin (the same applies to the following figures).
FIG. 1C shows the HPLC chart of a marketed chuhai C.
FIG. 1D shows the HPLC chart of the starting alcohol of Example 1.
FIG. 1E is the HPLC chart of 100 ppm of eriocitrin.

DETAILED DESCRIPTION OF THE INVENTION

Accordingly, the present invention provides a method of producing an alcohol-dipped material or a food or drink using the same which comprises the following steps: (a) freezing one or more fruits and/or vegetables employed as a raw material;
(b) micro grinding the frozen matter; and
(c) dipping the micro ground matter in an alcohol having a concentration at which one or more components of the raw material can be extracted.

Except in special cases, the term "fruit" as used herein includes pomaceous fruits, quasipomaceous fruits (citrus fruits, etc.), stony fruits, berry fruits, nutty fruits and fruit vegetables handled as fruits on the market (for example, strawberry, watermelon and melon). Any one of these fruits or a combination of two or more thereof may be used.

In the present invention, use can be preferably made of citrus fruits such as lemon, grapefruit (white and ruby red varieties), lime, oranges (navel orange, Valencia orange), Satsuma orange (*Citrus unshiu*), tangor, Chinese citron (*Citrus natsudaidai Hayata*), *Citrus hassaku, Citrus tamurana hort. ex T. Tanaka, Citrus depressa, Citrus sudachi, Citrus junos, Citrus sphaerocarpa, Citrus aurantium, Citrus iyo, Citrus reticulate*, Marumi Kumquat (*Fortunella japonica*), *Citrus sulcata, Oroblanco* and *Citrus grandis*. Also, use can be preferably made of stony fruits such as apricot, cherry, ume (*Prunus mume*), plums (Japanese plum, prune), peaches (peach, nectarine and yellow peach), berry fruits such as grapes (Muscat grape, Riesling grape, Delaware grape and Kyoho grape) and strawberry. Moreover, banana can be preferably used. Furthermore, use can be preferably made of blackberry, blueberry, raspberry, gooseberry (*Ribes grossularia* L.), pomegranate, apple, pears (Japanese pear, Chinese pear and European pear), *Chaenomeles sinensis*, kiwi fruit, pineapple, passion fruit, acerola, lychee, melon and watermelon. Other examples include *Akebia quinata*, atemoya (*Annona atemoya*), avocado, fig, olive, Japanese persimmon, *Cucumis metuliferus Naudin*, guava, *Elaeagnus* fruit, coconut, carambola (also called "star fruit"), tangero, *Annona sherimola*, durian, jujube, date palm, hascap (*Lonicera caerulea* L. var. emphyllocalyx Nakai), papaya, pitaya, Japanese loquat, longan, *Casimiroa edulis*, oriental melon, *Chaenomeles sinensis*, mango, mangostin and bayberry (*Myrica rubra*).

Except in special cases, the term "vegetable" as used herein includes leaf and stem vegetables, fruit vegetables (excluding those handled as fruits on the market), flower vegetables, root vegetables, beans and edible plant seeds. Moreover, shiso (*Perilla frutescens*), ginger, chili pepper, herbs (for example, mint, lemongrass, coriander, Italian parsley and rosemary) and wasabi (*Eutrema japonicum*) are also included therein. Either one of these vegetables or a combination of two or more thereof may be used. In the present invention, use can be preferably made of tomato, celery, carrot, parsley, spinach, watercress, sweet pepper, lettuce, cabbage, beet, ginger (root ginger and leaf ginger) and shiso (green shiso and purple shiso).

Although the present invention will be sometimes illustrated herein by referring to fruits by way of example, such illustration also applies to vegetables except in special cases.

According to the production method of the invention, the natural flavor of the fruit(s) and/or vegetable(s) can be fully utilized in the obtained alcohol drink product. In the present invention, therefore, use can be particularly preferably made of a fruit having a favorable aroma and well balanced taste (sweetness, sourness, bitterness and so on). From this point of view, it is preferable in the invention to use aromatic citrus fruits (in particular, lemon, grapefruit (white and ruby red varieties), lime, oranges (navel orange, Valencia orange), tangor, Chinese citron (*Citrus natsudaidai Hayata*), *Citrus hassaku*, *Citrus tamurana hort. ex T. Tanaka*, *Citrus depressa*, *Citrus sudachi*, *Citrus junos*, *Citrus sphaerocarpa* and Oroblanco).

According to the production method of the invention, the obtained alcohol drink can contain an efficacious component such as vitamin P contained in the fruit(s) and/or vegetable(s). From this point of view, it is preferable in the invention to use one or more vitamin P-rich fruits selected from among citrus fruits (in particular, lemon, grapefruit, Satsuma orange and orange), apricot, cherry, blackberry, pineapple and papaya. Vitamin P is a generic name that includes flavonoid compounds, for example, colorants (flavones) contained in citrus fruits, rutins contained in buckwheat and so on. Eriocitrin having the following structure:

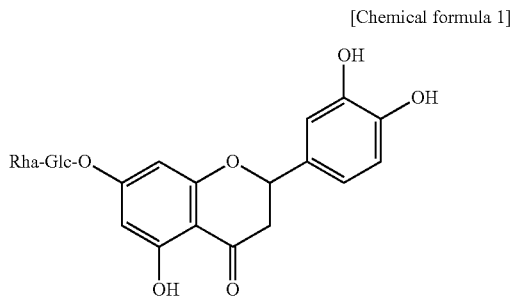

[Chemical formula 1]

and hesperidin having the following structure:

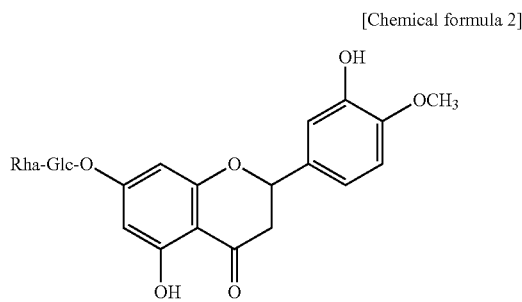

[Chemical formula 2]

fall within the scope of vitamin P. Vitamin P is also called "flavonoid" or "lemon polyphenol" in some cases.

Except in special cases, the term "fruit" or "vegetable" as used herein with respect to a raw material means a whole fruit or a whole vegetable involving juice and solid matters. Except in special cases, moreover, the term "fruit juice" or "vegetable juice" as used herein with respect to a raw material means a liquid having been preliminarily prepared by, for example, pressing. Namely, a fruit- or vegetable-origin liquid that is contained in the final product or the like as the result of using a whole fruit and/or vegetable as a raw material is excluded from the scope thereof.

The term "food" as used herein includes processed foods, while the term "drink" as used herein includes alcohol drinks, refreshing drinks, fruit juices and nutrition-supplement drinks.

Except in special cases, the term "liquor s" as used herein means drinks containing alcohol or liquids containing alcohol which is used as a material for producing a drink (also called "starting alcohol" in some cases).

Except in special cases, the term "alcohol" as used herein means a drinkable alcohol (ethanol, ethyl alcohol). It involves not only pure alcohol but also a drinkable liquid containing alcohol and/or a liquid usable in producing an alcohol-containing food. Except in special cases, the unit "%" as used herein with respect to alcohol concentration has the same meaning as degree of alcohol (°) and indicates the amount of pure alcohol contained per 100 mL of solution (volume/volume).

Except in special cases, the term "low alcohol drink" as used herein means an alcoholic drink containing less than 9% alcohol.

The freezing treatment in the step (a) is carried out to solidify the fruit(s) and/or vegetable(s) employed as a raw material by freezing to thereby prevent the components thereof from denaturation and make it possible to sufficiently and easily conduct the micro grinding at a low temperature in the subsequent step. So long as these objects can be achieved, this step is restricted neither in freezing machine nor in freezing method. That is, use may be made of any method selected from among, for example, the air freezing method, the air blast freezing method, the contact freezing method, the brine freezing method and the liquid nitrogen freezing method. From the viewpoint of achieving rapid freezing, a freezing method using liquid nitrogen is favorable.

It is preferable that the freezing is conducted at a temperature not higher than the brittle temperature of the fruit(s) and/or vegetable(s).

The fruit(s) and/or vegetable(s) to be treated in the step (a) are not restricted in size so long as they can be supplied into a freezer. To minimize the freezing time, it is possible in some cases to cut them into small pieces. To minimize damage and conduct freezing while preventing contact with air, on the other hand, it is preferable in some cases to avoid cutting them into too small pieces. It is possible to use a whole fruit or vegetable including pericarp and seeds. Alternatively, it is possible to remove a nonedible part, a part containing no effective component and/or a part containing an undesirable component before using. These parts may be removed after the completion of the step (a). In the case of using a citrus fruit, for example, it is possible to divide the whole fruit having the pericarp into 2 to 16 portions or cutting it into pieces (about 1 cm×about 1 cm) before subjecting it to the step (a). In the case of using a stony fruit, it is possible to subject the whole fruit having the pericarp and the seed as such to the step (a).

The micro grinding treatment in the step (b) is carried out to make it possible to sufficiently and easily conduct the subsequent extraction step without heating. So long as this object can be achieved, this step is restricted neither in grinding machine nor in micro grinding method. It is preferable to complete the micro grinding under frozen conditions with the use of liquid nitrogen within as short a time as possible. The extent of the micro grinding is not particularly restricted, so long as the extraction can be sufficiently and easily conducted thereafter. The micro grinding is conducted until an average grain size of the frozen matter is attained of about 1 µm to about 1000 µm, preferably about 1 µm to about 200 µm, more preferably about 1 µm to about 100 µm, when measured by a method commonly employed in the art. Considering the fact that the cell size of citrus fruits such as lemon ranges from 10 to 50 µm and the oil sac size in the epicarp (flavedo) thereof is about 250 µm (Osamu Ichikawa, Shokuhin Soshikigaku, Tokyo Koseikan, p. 239), it is preferable to micro grind the fruit until an average grain size is reduced to less than about 50 µm, for example about 40 µm or about 30 µm. Except in special cases, the average grain size of the micro ground matter obtained by the micro grinding treatment as described herein means the median size (the grain size corresponding to 50% on a sieve analysis distribution curve, also called "medium size" or "50% grain size").

The frozen and micro ground fruit(s) and/or vegetable(s) thus obtained is then subjected to the extraction step (c). This frozen and micro ground matter may be subjected to the dipping step as it is. Alternatively, it may be thawed to give a paste which is then dipped.

The extraction in the step (c) is carried out by dipping the frozen and micro ground matter in an alcohol without heating. As the alcohol to be used in the step (c), an alcohol having an alcohol concentration of from about 15% to about 100% (preferably from about 25% to about 60%) is employed so that the target water-soluble component and/or a fat-soluble component originating in the fruit(s) and/or vegetable(s) can be sufficiently and/or balancedly extracted while taking the flavor, stability, microbial management and so on into consideration. By altering the alcohol concentration, the type or content of a flavor or efficacious component can be varied. More specifically, in the case of using a fruit (in particular, a citrus fruit typified by lemon), the alcohol concentration can be controlled to about 20% or more, preferably about 30% or more and still preferably about 40% or more. From the viewpoint of preventing an undesirable taste (for example, bitterness) and an offensive odor (for example, musty odor), the alcohol content may be regulated to about 60% or less, preferably about 50% or less. Moreover, from the viewpoint of placing emphasis on transparency, it is possible to select such an alcohol concentration as giving a turbidity of about 120 Helm or less. In the case of using a fruit (in particular, a citrus fruit typified by lemon), the alcohol concentration may be controlled to, for example, about 15% to about 50%, preferably about 20% to about 45%. In the case of using a fruit (in particular, a citrus fruit typified by lemon), it is preferable for producing a balanced product to control the alcohol concentration to, for example, about 20% to about 60%, preferably about 30% to about 50% and still preferably about 40%.

The alcohol to be used in the step (c) may be either raw alcohol or liquors. The method of producing the same is not particularly restricted. Namely, use can be made of either a brewed alcohol drink, a distilled alcohol drink or a liqueur. The starting material thereof is not specifically restricted either. As the alcohol to be used in the dipping and the extraction, use may be made of either a single alcohol or a combination of multiple alcohols.

As the alcohol to be used in the step (c), use can be appropriately made of a raw alcohol, a distilled alcohol drink or a liqueur. As the distilled alcohol drink, it is preferable to use shochu, which may be produced from any raw material selected from among rice, potato, barley, corn, buckwheat, brown sugar, molasses, date palm, crudely distilled alcohol and so on, and which may be either korui (multiply-distilled) or otsurui (singly-distilled) shochu, vodka or spirit. In addition, use can be also made of whiskey, brandy, rum, tequila, etc.

In the step (c), the dipping ratio and the extraction time can be appropriately determined depending on the type of the material, the grain size of the micro ground matter, the type and amount of the target component to be extracted, the desired extraction efficiency and so on. With respect to the dipping ratio, the frozen and micro ground matter is used generally in an amount of from about 1 g to about 500 g, preferably from about 5 g to about 300 g and still preferably from about 10 g to about 200 g, per 1 L of the alcohol. The extraction time generally ranges from about half a day to several months. In the case of a citrus fruit, the extraction time is preferably from about a day to about 3 days, while a stony fruit such as ume may be extracted over several months.

By adjusting the conditions (for example, extraction time, alcohol degree, amount of the fruit and so on) in the step (c), the flavor and components of the final product can be controlled. Accordingly, it becomes possible to maintain stable qualities of the alcohol-dipped material or a food or drink using the same thus obtained, even though the raw fruit(s) and/or vegetable(s) vary in quality, etc.

After completion of the extraction step, the alcohol-dipped material is obtained either directly from the leachate or after removing solid matters therefrom by filtration. For the filtration, use can be made of a method commonly employed in the art for the same purpose, for example, the method using diatomaceous earth. The alcohol-dipped material thus obtained may be subjected to an additional treatment such as distillation, if needed.

Since the freezing step is employed without resorting to heating in the production method of the present invention comprising the steps (a) to (c), components originating in the raw material can thereby be prevented from loss, denaturation caused by oxidation and so on. Since the dipping and extraction are conducted with the use of an alcohol having an adequate concentration, moreover, the alcohol-dipped material obtained by the production method according to the invention can sufficiently and/or balancedly contain the desired component and, therefore, has a satisfactory flavor without further addition of any perfume, fruit juice, etc. Furthermore, it is surprisingly found that a component capable of preventing denaturation can be easily extracted by dipping the frozen and micro ground matter. Thus, the alcohol-dipped material obtained by the production method of the invention suffers from little denaturation in components such as flavor components and has a high storage stability. Such an alcohol-dipped material is a novel one which can never been obtained by existing techniques. Accordingly, the present invention further provides an alcohol-dipped material which can be obtained by the production method comprising the steps (a) to (c) as described above; namely, an alcohol-dipped material which is obtained by the production method comprising the steps (a) to (c) as described above, an alcohol-dipped material having the same composition as it, and an alcohol-dipped material which contains a component (preferably vitamin P, still preferably eriocitrin and hesperidin) extracted from a frozen and micro ground matter of fruit(s) and/or vegetable(s) employed as a raw material (in a preferable case, the fruit(s) and/or vegetable(s) employed as a raw material comprise one or more member selected from the group consisting of lemon, grapefruit, Satsuma orange, orange, apricot, cherry, blackberry, pineapple and papaya) with a 15% to 100% alcohol.

The alcohol-dipped material of the invention can be taken as it is as a drink. Also, the alcohol-dipped material can be used as a starting alcohol in production of various alcohol drinks. Namely, it is suitably usable as a starting alcohol in producing liqueurs and spirits, in particular, low alcohol drinks including RTDs such as chuhai.

The alcohol-dipped material of the invention sufficiently and/or balancedly contains the desired component and thus has a satisfactory flavor without further addition of any perfume, fruit juice, etc. By using it as a starting material, therefore, a low alcohol drink, etc. having a sufficiently favorable flavor can be obtained without addition of a fruit juice or a vegetable juice or any food additive such as a perfume, a souring agent or a colorant or by addition only a small amount thereof. The alcohol-dipped material of the invention is produced not by adding the frozen and micro ground matter to an alcohol solution having a low concentration but extracting the component by once dipping the frozen and micro ground matter in the about 15% to about 100% alcohol. By using this alcohol-dipped material as a starting material, therefore, it is possible to obtain a low alcohol drink, etc. which contains the desired component in a sufficient amount and undesired components in a reduced amount.

As a preferred embodiment of the present invention, there is provided a low alcohol drink which is produced by using the alcohol-dipped material according to the invention as a starting alcohol (in a 40% alcohol product, for example, it can be used in an amount of from about 1% to about 25% (volume/volume)) and contains no perfume. As another preferable embodiment of the invention, there is provided a low alcohol drink which is free from perfume, contains only 5% (volume/volume) or less, preferably 3% or less and still preferably 1.5% or less or even 0% of a fruit juice and has a sufficiently good taste. By addition of a perfume, a low alcohol drink having an enriched aroma can be produced.

The alcohol-dipped material of the invention and the frozen and micro ground matter obtained in the production process according to the invention are applicable not only to alcohol drinks but also to other drinks (for example, a fruit/vegetable juice, a carbonated drink and a nutrition-supplement drink) and foods (for example, a jam, a jelly, an ice cream, a yogurt, a cake and a salad).

The alcohol-dipped material of the invention and a food and a drink using the alcohol-dipped material of the invention as a starting material may contain a saccharide and a souring agent. As the saccharide, use can be made of, for example, sucrose, fructose, glucose, high-fructose corn syrup and so on. As the souring agent, use can be made of, for example, citric acid, malic acid, phosphoric acid and so on.

EXAMPLE 1

Production of Alcohol Having Frozen and Micro Ground Lemon Dipped in Alcohol

Fresh lemon fruits were divided into 4 portions so that they could be supplied into a freeze dryer, as will be described hereinafter, and then frozen therein by using liquid nitrogen at −196° C. Next, the frozen matter was supplied into a frozen grinder (Linrex Mill; manufactured by IPROS CO.) and micro ground in the frozen state to give a frozen and micro ground matter in the form of a white and loose powder having a grain size of about 30 μm. The grain size was determined by diluting 20-fold the frozen and micro ground matter with water and measuring the grain size distribution with a Laser Diffraction Particle Size Analyzer (SALD-3100; manufactured by SHIMADZU CO.). Next, the frozen and micro ground matter was dipped in a 40% raw alcohol for 2 days (100 g/L). The obtained dipping solution was filtered through diatomaceous earth to thereby remove solid matters. Thus, alcohol (alcohol content: 40%) having frozen and micro ground lemon dipped in alcohol was obtained.

EXAMPLE 2

Production of Alcohol Having Frozen and Micro Ground Grapefruit Dipped in Alcohol Fresh grapefruits were divided into 8 portions so that they could be supplied into a freezer and then frozen therein by using liquid nitrogen at −196° C. Next, the frozen matter was supplied into a frozen grinder (see Example 1) and micro ground in the frozen state to give a frozen and micro ground matter in the form of a white and loose powder having a grain size of about 50 μm. The grain size was determined by the same method as in Example 1. The frozen and micro ground matter was dipped in a 40% raw alcohol for 2 days (100 g/L). The obtained dipping solution was filtered through diatomaceous earth to thereby remove solid matters. Thus, alcohol (alcohol content: 40%) having frozen and micro ground grapefruit dipped in alcohol was obtained.

EXAMPLE 3

Production of Low Alcohol Drink

By using the alcohols having frozen and micro ground grapefruit dipped in alcohol obtained in Examples 1 and 2, as a starting material, RTDs of the following compositions were produced.

TABLE 1

| | Composition | | |
| --- | --- | --- | --- |
| | Lemon RTD | Grapefruit RTD | Remarks |
| Starting alcohol (Ex. 1) | 25 mL | | alcohol 40% |
| Starting alcohol (Ex. 2) | | 25 mL | alcohol 40% |
| Raw alcohol | 8.7 mL | 8.7 mL | alcohol 95% |
| Saccharide | 9.8 g | 9.8 g | |
| Souring agent | 0.8 g | 0.8 g | |
| Carbonic water | ca 210 mL | ca 210 mL | |
| Total | 250 mL | 250 mL | |

The RTDs respectively using the starting alcohols of Examples 1 and 2 each had a fresh and soft flavor differing from the existing chuhai products using lemon or grapefruit.

EXAMPLE 4

Comparison in Components with Existing Products

The starting alcohol of Example 1, a marketed chuhai A (lemon juice content: 3%, alcohol content: 7%), a marketed chuhai B (lemon juice content: 10%, alcohol content: 7%) and a marketed chuhai C (lemon juice content: 5%, alcohol content: 7%) were analyzed by HPLC.

Pretreatment:

The starting alcohol of Example 1 was filtered as such through a 0.45 μm filter and the obtained supernatant was employed. A 10 mL portion of each of the marketed chuhais was sampled, concentrated 10-fold on an evaporator and filtered through a 0.45 μm filter before using.

HPLC analysis conditions:

Column: Develosil C30-UG-5 (4.6 i.d.×150 mm)

Elution: 0 to 100% $CH_3CN$, 0.05% TFA/30 min

Detection: UV 280 nm

Flow rate: 1 ml/min

Sample injection: 10 μL

The results are shown in FIG. 1 and the following Table. The RTD of the present invention using the starting alcohol of Example 1 contained a large amount of lemon polyphenol. Further, it contained a smaller amount of contaminants than the marketed chuhai B containing a relatively large amount of the fruit juice.

TABLE 2

| Lemon polyphenol content | | | | |
|---|---|---|---|---|
| | RTD of the invention* | Chuhai A | Chuhai B | Chuhai C |
| Hesperidin | 4 | 0 | 2 | 0 |
| Eriocitrin | 10 | 0 | 10 | 2 |
| Remarks | Fruit: 1% | Juice: 3% Perfume: + | Juice: 10% Perfume: + | Juice: 5% Perfume: + |

*Containing 10% (v/v) of the starting alcohol of Example 1.

EXAMPLE 5

Comparison of Production Methods 1

The RTD using the starting alcohol of Example 1, an RTD using a starting alcohol produced by grinding with a mixer without freezing and micro grinding, and the marketed chuhai B (see Example 4) were compared.

Production of RTD:

The same lemon fruits as used in Example 1 were not frozen but ground as such using a mixer for household use. The ground matter was dipped in a 40% raw alcohol for 2 days and filtered to thereby give starting alcohol. By using the starting alcohol obtained in Example 1 and the starting alcohol obtained herein (Comparative Example 1) respectively, RTDs of the compositions as shown in the following Table were produced.

TABLE 3

| | Composition | | |
|---|---|---|---|
| | Frozen-ground RTD | Mixer-ground RTD | Remarks |
| Starting alcohol (Ex. 1) | 25 mL | | alcohol 40% |
| Starting alcohol (C. Ex. 2) | | 25 mL | alcohol 40% |
| Raw alcohol | 8.7 mL | 8.7 mL | alcohol 95% |
| Saccharide | 9.8 g | 9.8 g | |
| Souring agent | 0.8 g | 0.8 g | |
| Carbonic water | ca 210 mL | ca 210 mL | |
| Total | 250 mL | 250 mL | |

The frozen-ground RTD was superior in fresh flavor to the mixer-ground RTD.

Forced Accelerated Denaturation Test:

Each RTD was subjected to a forced accelerated denaturation test at 50° C. After the completion of the forced denaturation, the RTDs were evaluated by a sensory test.

The sensory test was conducted on a 0 to 5 score basis (giving 5 points to each control having ideal qualities and 0 point to a sample having no commercial value) by 4 skilled panelists. The following Table shows the results.

TABLE 4

| Sensory evaluation (average of 4 panelists) | | | | |
|---|---|---|---|---|
| | | Frozen-ground RTD | Mixer-ground RTD | Chuhai B |
| Control | | 5 | 5 | 5 |
| 50° C. | 3 days | 3.4 | 2.8 | 2.5 |
| 50° C. | 6 days | 2.1 | 1.4 | 1.5 |
| 50° C. | 12 days | 0.9 | 0.2 | 0.0 |

The frozen-micro ground RTD suffered from less denaturation in flavor than the mixer-ground RTD and Chuhai B. This is seemingly because the freezing/micro grinding would promote the extraction of a component capable of preventing denaturation.

EXAMPLE 6

Comparison of Production Methods 2

By using whole lemon fruits, an RTD (RTD1), in which alcohol having a frozen and micro ground matter dipped in alcohol was used, and another RTD (RTD2), which was produced by blending the frozen and micro ground matter as such (i.e., without dipping) and filtering, were compared.

Production of RTDs:

TABLE 5

| | Composition | | |
|---|---|---|---|
| | RTD 1 | RTD 2 | Remarks |
| Starting alcohol (Ex. 1) | 4 mL | | micro ground matter 10% w/v-alcohol 40% |
| Micro ground matter | | 0.4 g | |
| Raw alcohol | 17.6 mL | 19.3 mL | alcohol 95% |
| Saccharide | 5.0 g | 5.0 g | |
| Souring agent | 0.6 g | 0.6 g | |
| Carbonic water | ca 210 mL | ca 222 mL | |
| Total | 250 mL | 250 mL | |

Forced Accelerated Denaturation Test:

Each RTD was subjected to a forced accelerated denaturation test at 50° C. by use of a control having been stored at 5° C. After the completion of the forced denaturation, the RTDs were evaluated by a sensory test.

The sensory test was conducted on a 0 to 5 score basis (giving 5 points to each control having ideal qualities and 0 points to a sample having no commercial value) by 4 skilled panelists. The following Table shows the results.

TABLE 6

Sensory evaluation (average of 4 panelists)

|  |  | RTD 1 | RTD 2 |
|---|---|---|---|
| Control |  | 5 | 5 |
| 50° C. | 3 days | 3.8 | 2.9 |
| 50° C. | 6 days | 2.8 | 1.9 |
| 50° C. | 12 days | 1.9 | 0.8 |

Compared with RTD2 having the frozen and micro ground matter blended as such, RTD1 using the alcohol having the frozen and micro ground matter dipped in alcohol suffered from little denaturation in flavor. This is seemingly because the dipping would promote the extraction of a component capable of preventing denaturation.

When the controls were compared in flavor to each other, RTD1 using the alcohol having the frozen and micro ground matter dipped in alcohol showed a fresh and pronounced lemon flavor compared with RTD2 having the frozen and micro ground matter blended as such.

EXAMPLE 7

Analysis of Flavor Component

An RTD using the starting alcohol of Example 1 and another RTD containing a hand-pressed juice were analyzed by GC-MS.

Production of RTD:

TABLE 7

Composition

|  | Frozen-ground RTD | Hand-pressed RTD | Remarks |
|---|---|---|---|
| Starting alcohol (Ex. 1) | 25 mL |  | alcohol 40% |
| Juice (hand-pressed) |  | 2.5 g |  |
| Raw alcohol | 8.7 mL | 19.2 mL | alcohol 95% |
| Saccharide | 9.8 g | 9.8 g |  |
| Souring agent | 0.8 g | 0.8 g |  |
| Carbonic water | ca 210 mL | ca 222 mL |  |
| Total | 250 mL | 250 mL |  |

Pretreatment:

A 20 mL portion was collected from each sample and adsorbed by Extrelut 20. Then, flavor components were extracted with 66 mL of dichloromethane and concentrated at 35° C. under reduced pressure (450 mmHg) to 4 mL.

GC-MS analysis conditions:
Model: HP6890 (GC) and HP5973 (MS)
Column: HP-WAX (60 m×0.32 mm×0.5 μm)
Column temp.: 40° C. (5 min)-elevating at 10° C./min-100° C.
elevating at 5° C./min-230° C. (20 min)
Inlet temp.: 230° C.
Injection amount: 1 μL
Carrier gas: He (2.7 mL/min: constant flow rate)
Injection method: splitless (1 min)
Scanning scope: 35 to 450 m/z
Interface temp.: 230° C.
Ion source temp.: 230° C.

The following Table shows the results. The frozen/ground RTD contained the flavor components in larger amounts than the hand-pressed RTD.

TABLE 8

Results of analysis

| | Frozen/ground RTD | | | | | | Hand-pressed RTD | | | |
|---|---|---|---|---|---|---|---|---|---|---|
| | Storage time at 50° C. (days) | | | | | | | | | |
| | 0 | 1 | 2 | 3 | 6 | 0 | 1 | 2 | 3 | 6 |
| Citral | ND | ND | ND | ND | ND | ND | ND | ND | ND | ND |
| Limonene | 2737 | 1237 | 507 | 192 | 117 | 27 | ND | ND | ND | ND |
| Geranyl acetate | 195 | 97 | ND | ND | ND | ND | ND | ND | ND | ND |
| Linalool | 74 | 130 | 64 | ND | ND | ND | ND | ND | ND | ND |
| Geraniol | 30 | 46 | ND | ND | ND | ND | ND | ND | ND | ND |
| p-Cymen | 49 | 61 | 63 | 52 | 54 | ND | ND | ND | ND | ND |
| p-Cymen-8-ol | 13 | 112 | 166 | 167 | 219 | ND | ND | ND | ND | ND |

Measured in accordance with the method described in Example 4. (ppm)

EXAMPLE 8

Study on Alcohol Degree of Dipping Solution

Method:

By changing the alcohol degree of the raw alcohol to be used in the dipping to 20, 30, 40, 50 and 60%, alcohol having the frozen and micro ground matter (lemon) dipped in alcohol were produced. The production procedure of Example 1 was followed, but dividing the lemon fruits not into 4 portions but into smaller pieces (about 1 cm×about 1 cm) before supplying them into the frozen grinder. The frozen and micro ground matter was dipped as such without thawing and then filtered through 4-layered gauze employed as a substitute for diatomaceous earth.

The alcohol having the frozen and micro ground matter (lemon) dipped in alcohol at the respective alcohol degrees were each diluted 10-fold and subjected to a sensory evaluation and a turbidity measurement. By using the raw alcohol and water in the dilution, the final alcohol contents were all adjusted to 6%.

The sensory test was conducted on a 0 to 5 score basis by 9 skilled panelists.

The turbidity of each sample was measured at the point of adjusting the final alcohol content to 6%. In measuring the turbidity, a SIGRIST turbidimeter (Model KTL30-2M; manufactured by SIGRIST) was used.

Results:

The following Table shows the averages of the sensory evaluation scores by 9 panelists and turbidities.

TABLE 9

Sensory evaluation (average of 9 panelists)

|  | 20% | 30% | 40% | 50% | 60% |
|---|---|---|---|---|---|
| Score (perfect score: 5) | 2.1 | 2.8 | 3.9 | 3.7 | 3.3 |

TABLE 9-continued

| | Sensory evaluation (average of 9 panelists) | | | | |
|---|---|---|---|---|---|
| | 20% | 30% | 40% | 50% | 60% |
| Free comment | Juicy but somewhat greenish smell. Faint flavor in total. | Juicy but somewhat faint flavor. | Well-balanced sourness and sweetness. Natural and pronounced lemon taste. | Pronounced peel texture but strong bitterness. | Pronounced and strong lemon taste but somewhat musty odor. |

TABLE 10

| | Turbidity | | | | |
|---|---|---|---|---|---|
| | 20% | 30% | 40% | 50% | 60% |
| Turbidity (Helm) | 118 | 70 | 120 | 332 | 348 |

An alcohol content of 40% or higher was preferable in the dipping, since a pronounced lemon taste could be obtained in such a case. Bitterness or musty odor became noticeable at an alcohol content of 50% or higher, while turbidity was observed at a low alcohol content. Thus, the optimum alcohol content was 40%.

EXAMPLE 9

Study on Grain Size of Micro Ground Matter

Method:

Lemons and grapefruits were frozen and ground with adjustment of the average grain size to 40, 100 and 200 µm by controlling the freezing/grinding conditions (time, etc.), thereby producing alcohol drinks having the frozen and micro ground matters dipped in alcohol.

The production methods of Examples 1 and 2 were followed, but dividing the lemon fruits not into 4 portions but into smaller pieces (about 1 cm×about 1 cm) before supplying them into the frozen grinder. The frozen and micro ground matter was dipped as such without thawing and then filtered through 4-layered gauze employed as a substitute for diatomaceous earth.

The alcohols having the frozen and micro ground matters (lemon, grapefruits) at the respective grain sizes dipped in alcohol were diluted 4-fold with water and then subjected to a sensory test which was conducted on a 0 to 5 score basis by 9 skilled panelists as in Example 8.

Results:

The following Table shows the averages of the sensory evaluation scores by 9 panelists.

TABLE 11

| | Sensory evaluation (average of 9 panelists) | | | | | |
|---|---|---|---|---|---|---|
| | Lemon | | | Grapefruit | | |
| | 40 µm | 100 µm | 200 µm | 40 µm | 100 µm | 200 µm |
| Score (perfect score: 5) | 4.1 | 3.5 | 2.4 | 4.1 | 3.9 | 3.1 |
| Free comment | Fresh and pronounced lemon flavor. | Fresh lemon taste but somewhat faint aroma and bitterness. | Somewhat flat aroma and enhanced bitterness. | Well-balanced sweetness, sourness and bitterness. Fresh taste of grapefruit. | Fresh but somewhat greenish. | Somewhat faint aroma and strong bitterness. |

From the viewpoint of flavor, the optimum grain size was 40 µm.

The cell size of citrus fruits such as lemon ranges from 10 to 50 µm and the oil sac size in the epicarp (flavedo) thereof is about 250 µm (Osamu Ichikawa, Shokuhin Soshikigaku, Tokyo Koseikan, p. 239). Thus, it is assumed that by grinding to a grain size of 40 µm, intracellular components including essential oil are all homogeneously taken out into the powder.

EXAMPLE 10

Study on the Effect of Freezing/Micro Grinding

Method:

An alcohol having the frozen and micro ground matter (lemon) dipped in alcohol was produced. The production method of Example 1 was followed, but a sample produced by dividing the lemon fruits not into 4 portions but into smaller pieces (about 1 cm×about 1 cm) and supplying into the frozen grinder, which was referred to as a control (with FC), was compared with another sample produced by merely dividing the lemon fruits not into 4 portions but into smaller pieces (about 1 cm×about 1 cm) and not supplying them into the frozen grinder but freezing as such (no FC). Both of the frozen/micro ground sample and the non-ground sample were dipped as such without thawing and then filtered through 4-layered gauze employed as a substitute for diatomaceous earth.

The alcohols having the frozen and micro ground matters (lemon, grapefruits) at the respective grain sizes dipped in alcohol were diluted 4-fold with water and then subjected to a sensory test which was conducted on a 0 to 5 score basis by 9 skilled panelists as in Example 8.

Results:

The following Table shows the averages of the sensory evaluation scores by 9 panelists.

TABLE 12

| Sensory evaluation (average of 9 panelists) | | |
|---|---|---|
| | With FC | No FC |
| Score (perfect score: 5) | 4.2 | 2.8 |
| Free comment | Fresh and natural taste of the whole lemon fruit. Well-balanced sourness and bitterness of lemon. | Only small amount of total aroma and less fresh taste. Off-balanced sourness and bitterness. |

Compared with the sample produced by merely dividing lemon fruits into pieces (about 1 cm×about 1 cm), the sample produced by grinding lemon fruits to give a grain size of 40 μm showed a pronounced lemon taste. Thus, it is preferred to conduct the freezing/micro grinding to give a grain size of 40 μm.

EXAMPLE 11

Production of Alcohol Having Frozen and Micro Ground Matter (ume) Dipped in Alcohol, and Low Alcohol Drink Alcohol having a frozen and micro ground matter (ume) dipped in alcohol was produced. The production method of Example 1 was followed, but green ume fruits were employed and supplied into the frozen grinder as a whole, i.e., with stones. The frozen and ground matter was not thawed but dipped in alcohol as such.

By using the alcohol having the frozen and micro ground matter (ume) dipped in alcohol as the starting alcohol, an RTD of the following composition was produced.

TABLE 13

| Composition | | |
|---|---|---|
| | Ume RTD | Remarks |
| Starting alcohol (Ex. 1) | 25 mL | alcohol 40% |
| Raw alcohol | 8.7 mL | alcohol 95% |
| Saccharide | 20 g | |
| Souring agent | 1.0 g | |
| Carbonic water | ca 204 mL | |
| Total | 250 mL | |

This RTD had a new flavor having the pronounced green ume taste, differing from the conventional chuhai products, diluted umeshu (ume liquor) or ume juice. The existing umeshu should be aged for at least 3 months (usually 6 months to 1 year) before taking. In contrast, the RTD obtained by the production method of the present invention could give a pronounced taste of green ume after dipping for only 1 to 3 days.

EXAMPLE 12

Analysis of α-Tocopherol (Vitamin E)

Alcohol drinks having the frozen and micro ground matters (lemon, grapefruit and ume) dipped in alcohol were produced. In the case of lemon, grinding was conducted so that the grain size was adjusted to 40, 100 and 200 μm as in Example 9. Next, the α-tocopherol (vitamin E) content in each alcohol drink was measured by the following method.

TABLE 14

Alcohol drink having frozen/ground matter dipped
in alcohol 1 ml
↓       ←       1 ml 6% pyrogallol/ethanol
↓       ←       1 ml PMC (0.15 μg)
Preheating 70° C., 3 min
↓       ←       0.2 ml 60% KOH
Heating 70° C., 30 min
↓
Cooling in ice water
↓       ←       4.5 ml 1% NaCl
Extraction        (3 ml 10% ethyl acetate/hexane)
↓
Centrifugation 3000 rpm, 5 min
↓
Collection of n-hexane layer (2 ml)
↓
Evaporation (stream of $N_2$)
↓
Residue
Dissolved in 200 μl of n-hexane
↓
HPLC 10 μl injection Note)
PMC: internal standard (2,2,5,7,8-pentamethyl-6-chromanol)

HPLC analysis conditions:
Analysis column: Nucleosil NH2 (250 mm×4.6 mm i.d.)
Mobile phase: n-hexane/2-propanol (97:3 v/v)
Flow rate: 1.2 ml/min
Detector: RF10Ax1 (fluorescent detector) (Ex. 297 nm, Em. 327 nm)

The following Table shows the α-tocopherol concentrations in the individual alcohol drinks and the α-tocopherol concentrations in the alcohol drinks produced by changing the lemon grain size.

TABLE 15

| α-Tocopherol concentration | |
|---|---|
| | Concentration |
| Lemon | 32.16 ppm |
| Grapefruit | 11.10 ppm |
| Ume | 16.87 ppm |
| 40 μm | 31.56 ppm |
| 100 μm | 26.54 ppm |
| 200 μm | 21.46 ppm |

Thus, it could be understood that the alcohols produced by dipping the frozen and micro ground matters (lemon, grapefruit and ume) all contained vitamin E. It was also found out that the extraction efficiency was elevated with a decrease in the grain size.

The invention claimed is:
1. A method of producing a food or drink comprising the following steps:
(a) freezing one or more fruits and/or vegetables employed as a raw material;
(b) micro grinding the frozen fruit(s) and/or vegetable(s) until an average grain size of the micro ground fruit(s) and/or vegetable(s) is about 1 μm to about 100 μm; and
(c) dipping the micro ground fruit(s) and/or vegetable(s) in a 15% to 100% alcohol to obtain a dipping solution, wherein the micro ground fruit(s) and/or vegetable(s) are dipped when frozen or thawed to give rise to a paste, and wherein the 15% to 100% alcohol is capable of extracting one or more components of the raw material;

(d) including the dipping solution as an ingredient of the food or drink.

2. The method according to claim 1, wherein the fruit(s) and/or vegetable(s) employed as a raw material is one or more fruits selected from the group consisting of citrus fruits including lemon and grapefruit, stony fruits including ume (*Prunus mume*) and peach, berry fruits including grape and banana.

3. The production method according to claim 1, wherein the component extracted in the step (c) is vitamin P.

4. The production method according to claim 3, wherein the component extracted in the step (c) is eriocitrin and hesperidin.

* * * * *